B. F. POWER.
Carriage Spring.

No. 92,093.

Patented June 29, 1869.

Witnesses.
Fred. Artos.
Chas. C. Wilson

Inventor.
Benj.a F. Power
by his Attys A.H. & R.H. Evans.

United States Patent Office.

BENJAMIN F. POWER, OF MORGAN COUNTY, OHIO.

Letters Patent No. 92,093, dated June 29, 1869.

IMPROVEMENT IN CARRIAGE-SPRING.

The Schedule referred to in these Letters Patent and making part of the same.

*To all whom it may concern:*

Be it known that I, BENJAMIN F. POWER, of Morgan county, Ohio, have invented a new and improved Spring for Carriages and Other Vehicles, of which the following is a full, clear, and exact description, reference being had to the accompanying drawings, making part of this specification, in which—

Figure 1:
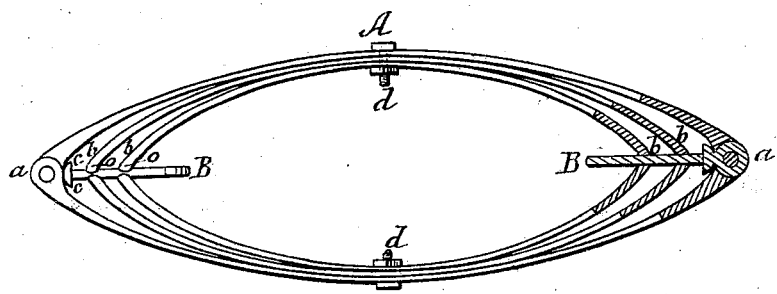
Figure 2:

Figure 1 is a side view of the spring.
Figure 2 is an end view of the same.

The object of my invention is to provide, as nearly as possible, an anti-friction spring, which will be self-adjustable to stronger or weaker leaves, as the case may be; and My invention consists in bars, so connected with the hinges of the spring that the said bars will be flexible and self-adjustable, and upon which rest the inner couplet of leaves. These couplets differ in length, but when they are subjected to depression, they unite to support each other without friction, and each couplet forms of itself a perfect spring.

To enable others skilled in the art to understand and use my invention, I will proceed to describe the manner in which I have carried it out.

In the said drawings—

A represents the spring, united at its ends by hinges $a$ $a$.

B B are flexible bars, so connected with the hinges $a$ $a$ as to be self-adjustable when pressed upon by the leaves $b$ $b$.

$c$ $c$ are shoulders, to prevent too much play of the bars B B.

These leaves are secured in couplets to the springs at $d$ $d$, by bolts or other suitable means, and are allowed to move freely at their ends $o$ $o$ on the bars B B.

It will be evident that upon any depression being brought to bear upon a spring thus constructed, the ends $o$ $o$ of the leaves $b$ $b$ will move upon the bars B B, almost entirely without friction, the bars at the same time adjusting themselves up or down, as the leaves may be weaker or stronger, and thus equalizing the strain on each.

What I claim as my invention, and desire to secure by Letters Patent, is—

The spring A, in combination with flexible bars B B and leaves $b$ $b$, substantially as and for the purpose described.

Also, the single flexible bars B B, in combination with the leaves $b$ $b$, substantially as and for the purpose set forth.

Also, the leaves $b$ $b$, constructed substantially as and for the purpose set forth.

BENJAMIN F. POWER.

Witnesses:
JAS. M. GAYLORD,
JOHN F. SIGLER.